July 14, 1970  J. R. McGEHEE  3,520,503

OMNIDIRECTIONAL MULTIPLE IMPACT LANDING SYSTEM

Filed March 5, 1968  2 Sheets-Sheet 1

INVENTOR.
JOHN R. McGEHEE

BY

ATTORNEYS

July 14, 1970    J. R. McGEHEE    3,520,503
OMNIDIRECTIONAL MULTIPLE IMPACT LANDING SYSTEM
Filed March 5, 1968    2 Sheets-Sheet 2

INVENTOR.
JOHN R. McGEHEE
BY
ATTORNEYS

United States Patent Office 3,520,503
Patented July 14, 1970

3,520,503
OMNIDIRECTIONAL MULTIPLE IMPACT
LANDING SYSTEM
John R. McGehee, Newport News, Va., assignor to the
United States of America as represented by the Administrator of the National Aeronautics and Space
Administration
Filed Mar. 5, 1968, Ser. No. 710,562
Int. Cl. B63b 7/08; B64d 1/08; F16d 63/00
U.S. Cl. 244—138                                          4 Claims

ABSTRACT OF THE DISCLOSURE

A protective landing system having stowable, omnidirectional, energy-dissipating and multiple-impact capabilities for facilitating soft landing of instrument packages or the like.

---

The invention described herein was made by an employee of the United States Government and may be manufactured or used by or for the Government of the United States of America for governmental purposes without the payment of any royalties thereon or therefor.

This invention relates generally to an omnidirectional, energy-dissipating multiple-impact landing system and relates with particularity to a gas bag landing system which completely surrounds and isolates an instrument package for protection during omnidirectional and multiple impacts on a surface.

In man's continuous exploration of the mysteries of planetary bodies within our universe the use of instrumented soft landing capsules for early planetary exploration plays an important role in determining more information about a particular planet. The task of designing landing systems for survivable landings of instrumented payloads is complicated by the lack of adequate data on the atmospheres and the composition and construction of the surfaces of the various planets. These uncertainties could lead to multiple unoriented impacts occurring after initial touchdown of an instrument package or other payload. Hence, "first look" landings may well be done with ball-type capsules having omnidirectional, energy-dissipating and multiple impact capabilities, even if later missions are to be made with a more controlled type of landing where a directionally restricted landing system, such as a legged system, may be used.

It is therefore an object of the present invention to provide a novel landing system having omnidirectional and multiple-impact capabilities.

Another object of the present invention is a stowable omnidirectional, multiple impact landing system.

Another object of the present invention is a protective landing system for facilitating soft landing of instrument packages or the like on a planet after the completion of an interplanetary flight.

A further object of the present invention is the packaged combination of a payload and a landing system providing payload protection during landing of the payload on a surface.

An additional object of the present invention is the combination of a payload and a soft landing system for assuring safe landing of the payload on a planetary surface.

Another object of the present invention is a stowable omnidirectional, energy-dissipating, multi-impact landing system.

These and other objects are obtainable according to the present invention by providing an inflatable, spherical, capsule made of an inelastic flexible material and being internally divided into a centrally located main compartment for housing a payload package with a plurality of surrounding minor compartments adapted to house a gas or other inflation medium. During interplanetary flight, the gas bag of the present invention would be folded around the payload package and stowed within a space vehicle. When ready for landing on a planetary surface, the entire package would be released from the rocket vehicle with a gas bottle or other suitable inflation medium providing inflation for the package prior to its impact on the planetary surface. The capsule of the present invention is divided into a plurality of minor compartments between the exterior surface thereof and an interior compartment containing the payload. Each of these minor compartments is of substantially identical volume and provided with suitable small orifices or openings between each adjacent wall so as to provide communication between each of the minor compartments. Thus, when the gas bag is inflated, it is necessary only to inflate one of the compartments with the construction of the capsule tending to equalize the volume in each of the compartments and therefore each compartment would receive its equal share of the inflation medium. Upon impact, the impacting area of the capsule would cause the inflated compartments adjacent the impacting surface to be compressed thereby forcing the inflation medium into the remaining or storage compartments with a resulting pressure rise in these compartments. The increase in pressure of the gas in the compressed or distorted compartments in conjunction with gas flow through the orifices and associated orifice characteristics will result in dissipation of most of the landing energy but in the event of rebound, the individual compartments will tend to equalize themselves to present a substantially spherical surface for the capsule by the time it rebounds and strikes the impacting surface again. This procedure or operation is then repeated until the protected instrument package comes to rest on the planetary surface.

A more complete appreciation of the invention and many of the attendant advantages thereof will become more readily apparent from the following detailed description when considered in connection with the accompanying drawings wherein.

Figure 1:
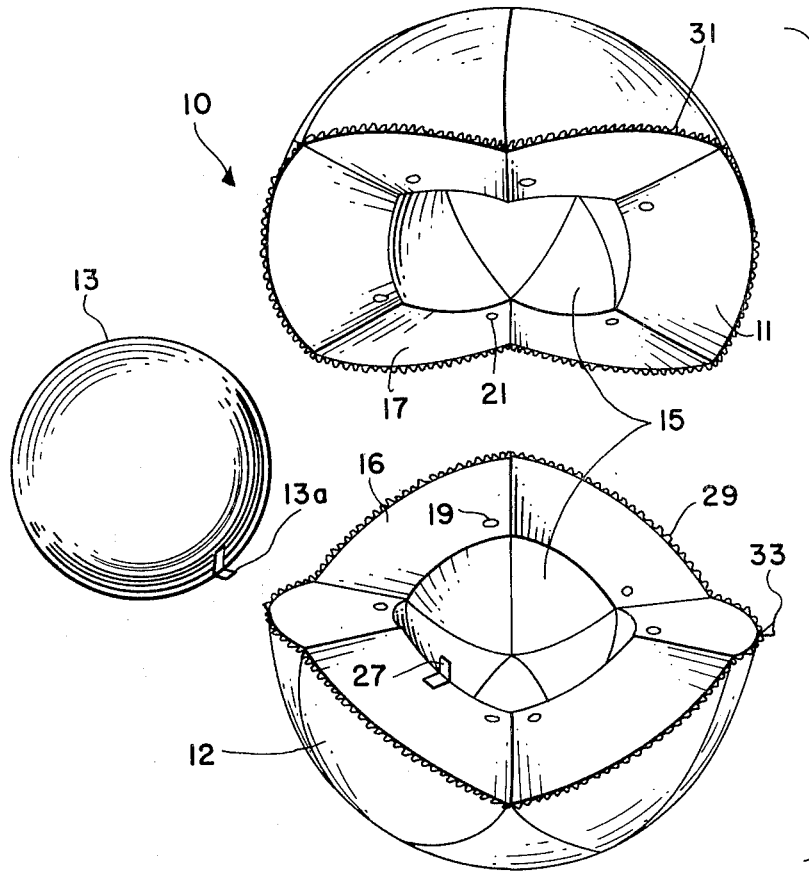
FIG. 1 is an exploded view of the inflated vehicle package of the present invention.

Referring now more particularly to the drawings wherein like reference numerals designate identical or corresponding parts in each of the views, and more particularly to FIG. 1, there is shown an exploded view of the vehicle package of the present invention as generally designated by reference numeral 10. Vehicle 10 includes two halves 11 and 12 of the gas bag landing system 14 which encases or encapsulates a suitable payload as designated by reference numeral 13. Each half 11 and 12 of gas bag landing system 14 is provided with a substantially centrally located half-spherical opening which forms a central main compartment 15, and a plurality of substantially equal volume minor compartments. Two of the minor compartments are designated by reference numerals 16 and 17. Each of the minor compartments 16 and 17, and those not designated, is in fluid connection with each adjacent minor compartment by way of three orifices, or one orifice for each of the three side walls of the compartment but none in the exterior or interior wall. Two such orifices in adjacent minor compartments in FIG. 1 are designated by reference numerals 19 and 21.

The two halves 11 and 12 of vehicle 10 are formed as shown in the exploded view of FIG. 1. The payload 13 is assembled within its own spherical container adapted to fit snug within compartment 15 formed between halves 11 and 12. When halves 11 and 12 are assembled the orifices 19 and 21 in the adjacent minor compartments 16 and 17 are in mating engagement to provide a fluid connection between these adjacent compartments. Other orifices, not shown, are provided in each minor compartment side wall except the internal and external side walls so that each minor compartment in the final assembly is in fluid connection with all adjacent compartments.

Figure 2:
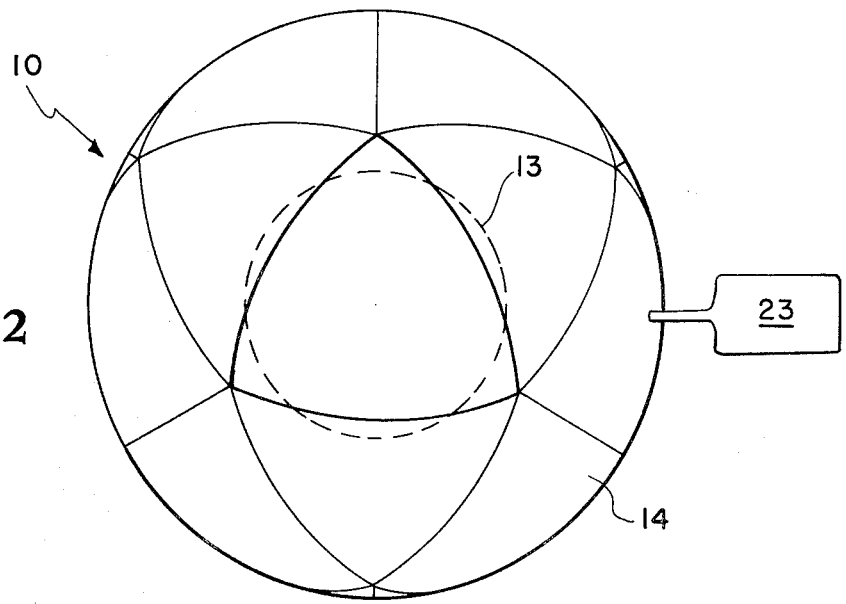
FIG. 2 is a view of the assembled inflated vehicle package combination of the present invention after being separated from a booster system and inflated, and prior to its impact on a planetary surface.

Referring now more particularly to FIG. 2 vehicle 10 is shown inflated after being released from its booster rocket system and prior to impact of the gas bag landing system 14 on a planetary surface. A suitable gas bottle 23, or other conventional inflation source, is provided in fluid connection with one of the minor compartments to provide an inflation medium for vehicle 10.

Figure 3:
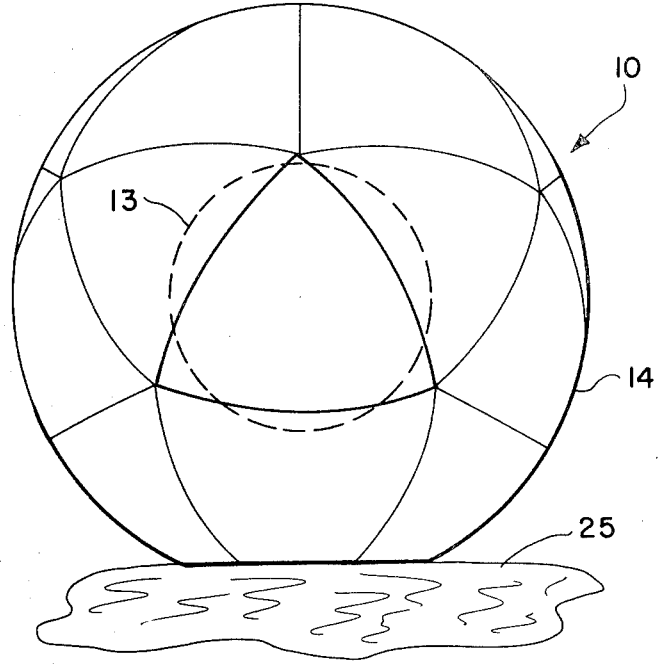
FIG. 3 is a view of the vehicle package of the present invention as it would appear during an initial impact on a planetary surface.

Referring now more particularly to FIG. 3, during impact of vehicle 10 on a planetary surface 25, or the like, the minor compartment or compartments in gas bag system 14 adjacent the impact surface will serve to absorb or dissipate the vehicle kinetic energy during impact. This energy dissipation is due to the inflation gas being compressed locally in the compartments adjacent the area of gas bag 14 that strikes the planetary surface with this compressed gas being forced through orifices 19, 21 and the like, in the walls into the adjacent compartments. Due to the inelasticity of the material from which gas bag 14 is constructed, the exterior configuration thereof does not deform appreciably except at the impact surface where it may collapse, wrinkle and fold as a result of its inability to support compression and its lack of bending stiffness. When the force resulting from the pressure generated in the gas bag system 14 is just sufficient to overcome the inertial forces of the vehicle, vehicle rebound is initiated. However, at this instant, internal gas flow from the compressed compartments in contact with the surface to the uncompressed compartments is still occurring through orifices 19, 21, and those not shown. Thus, there is a phase leg between the internal gas flow cycle and the impact-rebound cycle which produces a situation wherein some of the kinetic energy which has been converted to internal energy of the gas and stored as potential energy in the compressed compartments during impact is not available during rebound. If the skin of gas bag landing system 14 is inelastic, but flexible, the part of the skin not in contact with the ground may be expected to remain essentially undeformed during the impact process, while if the skin is elastic, it will flatten out at impact and the payload will strike the surface while moving at a high velocity. The expression "inelastic" as used herein denotes that the skin of gas bag 14 will support only tension and is essentially nonstretchable such that it will not deform appreciably except at the impact surface. At the impact surface the skin of gas bag 14 may collapse, wrinkle and fold as a result of its inability to support compression and its lack of bending stiffness.

The impact characteritics of a simple test vehicle consisting of a compartmented cylinder attached to a collapsible gas bag was investigated experimentally to determine the energy dissipation capabilities of the present system. Analytical expressions based on one dimensional-flow theory were obtained for acceleration, velocity, stroke, and compartment pressures for the test vehicle as well as for spherical gas bag landing systems. Experimental and analytical results were in good agreement; computed and experimental values of kinetic energy dissipated by the test system agreeing within five percent. In the experiments the kinetic energy dissipated was as great as ninety percent of the kinetic energy of the test vehicle at touchdown. Comparable energy dissipation was also obtained from preliminary computations for earth landing of the proposed spherical gas bag landing system.

OPERATION

The stowable, omnidirectional, energy-dissipating, and multiple impact capabilities of the present invention are obtained by surrounding the payload 13 with a radially compartmented spherical gas bag 14, as shown in FIG. 1. As mentioned hereinbefore gas bag landing system 14 is formed of two identical half sections 11 and 12. Each half 11 and 12 in the illustrated embodiment consists of ten minor compartments i.e. 16 and 17 each of which has five sides. The interior and exterior side wall of each minor compartment are gas impermeable while the remaining three side walls are provided with one orifice each i.e. 19 and 21 which mates with and forms an interconnection with a like orifice in an adjacent compartment in such manner that all of the compartments in each half section 11 and 12 are in fluid interconnection. Payload 13 is provided with a suitable alignment tab 13a which snaps or otherwise conventionally attaches to restraining tab 27 integrally attached to one of the gas bag halves 11 and 12. Obviously, additional restraining and alignment tabs may be employed when desired and tabs 27 may be provided integrally secured to either or both bag halves 11 and 12.

Thus, payload 13 is placed in the main substantially semispherical compartment formed in half 12 and snaps 13a and 27 fastened together to maintain payload 13 in position relative to the bag half 12. The other gas-bag half 11 is then placed in position so as to completely encase payload 13 within the spherical compartment 15 formed between the bag halves. The half sections 11 and 12 are aligned so that the orifices 19 in one half mate with or are in alignment with like orifices 21 in the other half section to thereby provide fluid intercommunication between all of the minor compartments in gas bag 14. A suitable external zipper flap connection 29 and 31, which extends completely around both half sections 11 and 12 is fastened together to hold sections 11 and 12 into a unitary gas bag 14. In addition, the use of a suitable adhesive on the abutting faces of the adjacent halves, as well as an internal zipper or other conventional connection apparatus, such for example, snap tabs and the like, may be used to insure positive connection between halves 11 and 12 and are considered within the scope of the present invention.

After assembly, and in transit, gas bag 14 would be collapsed and stowed within a missile nose cone which is transported to the impact site by a suitable rocket booster, not shown. In the terminal phase, or for impact, the package vehicle 10 would be deployed from the entry vehicle and gas bag 14 pressurized by a suitable gas bottle 23, or the like, to the design initial pressure of the bag. Vehicle kinetic energy dissipation is achieved by the gas in the compartments being compressed locally in certain compartments and being forced through orifices in the compartment walls into adjacent or storage compartments. Eventually, the force resulting from the overall pressure generated in the gas bag system is just sufficient to overcome the inertial forces of vehicle 10 so that vehicle rebound is initiated. However, at this instant, gas is still flowing from the compressed compartments in contact with the surface into the remaining or storage compartments. Thus, there is a phase lag between the internal gas flow cycle and the impact-rebound cycle which produces a situation wherein all the potential energy stored during impact is not available during rebound. The orifices may be thought of as valves which partially block or throttle flow during vehicle rebound to prohibit full recovery of the initial vehicle kinetic energy. After the vehicle loses the initial contact with the impact surface, internal gas flow reverses and gas flows from the storage compartments to the formerly compressed compartments. Multiple-impact capability of the screen results because all gases remain within the bag, hence the bag recovers to initial spherical condition during rebound and is capable of protecting the payload from additional impacts.

Preliminary computations have been made for an earth landing of an instrument payload and a compartmented spherical air bag landing system to determine the variation of kinetic energy dissipation with initial bag pressure and orifice area. These computations are simplified since impact was limited to only one point on the surface of the sphere and volume distortion was limited to those compartments initially in contact with the landing surface. In order to determine the variation of kinetic energy dissipation with the aforementioned parameters, it was necessary to arbitrarily select bag geometry, impact velocity, instrument payload and landing system mass and limiting load. The spherical gas bag was assumed to have twenty equal volume compartments and to be six feet in diameter. The impact velocity was assumed to be approximately 150 feet per second which corresponds to a flightpath velocity that has been considered in connection with the proposed Mars landing of an instrument payload. The vehicle mass was assumed to be approximately six slugs. The estimated payload had an assumed diameter of two feet and a limiting deceleration load of 1,000 earth g-units. The variation of kinetic energy dissipation with air bag initial pressure shows that kinetic energy dissipation increases as bag initial pressure decreases and the maximum kinetic energy dissipation or minimum rebound occurs near a bag initial pressure of one atmosphere at absolute. For the range of bag initial pressures investigated, doubling the orifice area had very little effect on the kinetic energy dissipated.

Figure 4:
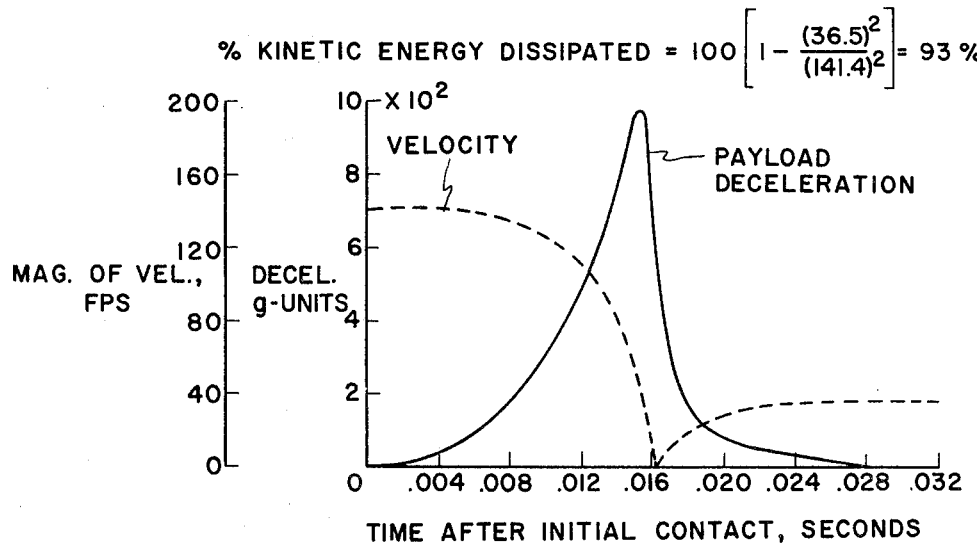
FIG. 4 is a graphic representation of the performance of a specific model of the present invention.

The computed results show that there is one value of orifice area for maximum kinetic energy dissipation for each initial bag pressure and this must be computed in each operation taking note that as initial bag pressure decreases, the orifice area at which minimum rebound volocity occurs, also decreases. Time histories of acceleration and velocity for an earth landing of the assumed vehicle are presented in FIG. 4 for values of orifice area and initial bag pressure which yield maximum kinetic energy dissipation or minimum rebound velocity. The maximum deceleration for this vehicle was approximately one thousand earth g-units and the rebound velocity was approximately thirty-five feet per second which corresponds to a value of energy dissipated at initial impact of approximately ninety percent. In obtaining these results the vehicle mass was equal to 6.24 slugs, internal pressure was 1.5 p.s.i.g., bag diameter 6.0 feet, payload diameter 2.0 feet, the minor bag compartments were twenty equal-volume compartments and an orifice radius of 0.3 inch was provided with three orifices being present in each compartment.

The results of the experimental investigation shows that the landing system described herein is valid and that kinetic energy dissipation capability of approximately 90 percent of the kinetic energy of the vehicle at touchdown may be readily obtained with the present design. Agreement between the experimental and computer results for the test system have proved good. The results of the preliminary study of an earth landing of a compartmented spherical bag indicate that initial bag pressure has a major influence on kinetic energy dissipation and that minimum rebound is achieved for initial bag pressure on the order of one atmosphere absolute. In addition, orifice area must be decreased as initial bag pressure is decreased in order to obtain minimum rebound velocity. The computed results obtained show that a vehicle can be stopped within the load limitation of one thousand earth g-units with less than ten percent of the initial kinetic energy appearing in the form of rebound velocity when utilizing the present invention.

Although no specific materials have been discussed for making the gas bag of the present invention, it is to be understood that any suitable flexible, inelastic and durable, gas impervious material may be employed for manufacturing the bag as long as it is capable of withstanding the impact velocities anticipated for the vehicles utilizing the present invention. Thus, bag 14 may be made of a resin impregnated glass or woven wire reinforced cloth fabric or any other suitable and conventional material which will be slightly flexible but relatively inelastic and that will withstand the impact loads anticipated for use with the present invention. Rubber materials are too elastic for the present invention since they undergo great distortions during impact. In addition, although specific figures have been given for one configuration of the present invention it is to be understood that the compartments to be used in practice of the present invention need not be limited to twenty and can be more or less and that the orifice size in the partitions between each compartment may be varied as the individual anticipated landing situation and pressurization of the gas bag dictates. Suitable inflation gases which may be dispersed from bottle 23 and considered useful with the present invention include, but not limited to, hydrogen, air, nitrogen, helium, argon and the like.

In addition, although the invention has been described primarily as a safe landing system for planetary landings it obviously has utility in the safe transporting here on earth and may be used in any application where maximum protection of a payload is desired. Only one example of the location of the inflation medium has been described and obvious modifications in this are considered within the scope of the present invention. For example, the gas bottle could be in the form of a torus or the like and form part of the packaged payload if aerodynamic forces on the externally arranged bottle might produce problems. Also, in some instances sublimation materials may be sealed within the minor compartments and adapted to inflate gas bag 14 under specified conditions. No specific structure has been shown or described for payload 13, it being understood that any suitable payload capable of being packaged into a suitable configuration for transportation within compartment 15 of gas bag 14 is considered within the scope of the present invention.

There are obviously many other modifications and variations of the present invention readily apparent to those skilled in the art in the light of the above teachings. It is therefore to be understood that the invention may be practiced otherwise than as specifically described.

What is claimed as new and desired to be secured by Letters Patent of the United States is:

1. The combination of a payload and a system for insuring a safe landing for said payload, said system having omnidirectional and multiple-impact capabilities and including:

gas bag means completely enclosing said payload and serving to absorb and dissipate impact shocks when said payload lands on a planetary surface, said gas bag means including an interior skin and an exterior skin, a plurality of spacer means integrally connecting said skins into a plurality of radially-oriented equal volume compartments, means for inflating said gas bag with an inflating gas, means interconnecting said equal volume compartments so that an increase in pressure against one said compartment will tend to force a quantity of gas within said one compartment into adjacent compartments, and said gas bag being formed of a pair of half-sections and said sections being joined together after the insertion of the payload therebetween by a zipper connection.

2. The combination of claim 1 including means for alining and restraining said payload within said gas bag.

3. The combination of claim 2 wherein said means for alining and restraining said payload includes an alinement tab integral with said payload and a restraining tab integral with one of said half-sections, said alinement tab and said restraining tab being connectable together.

4. The combination of claim 1 wherein said gas bag is formed of a pair of half sections, each said half section containing a plurality of equal volume compartments, said sections being joined together along compartment walls after the insertion of the payload therebetween, and hermetic seal means being provided for all joints in the final assembled combination.

References Cited

UNITED STATES PATENTS

| | | | |
|---|---|---|---|
| 2,381,394 | 8/1945 | Beach | 9—8 |
| 2,888,675 | 5/1959 | Pratt et al. | 244—31 X |
| 3,130,406 | 4/1964 | Jones-Hinton et al. | 9—11 X |
| 3,330,510 | 7/1967 | Johnson | 244—138 |
| 3,044,515 | 7/1962 | Eades | 150—1 |
| 3,410,511 | 11/1968 | Coppa | 244—138 |

FOREIGN PATENTS

| | | |
|---|---|---|
| 1,237,871 | 6/1960 | France. |

MILTON BUCHLER, Primary Examiner

J. E. PITTENGER, Assistant Examiner

U.S. Cl. X.R.

9—8; 188—1